United States Patent [19]

Vandervalk

[11] 4,184,167

[45] Jan. 15, 1980

[54] INK JET COLLECTION SYSTEM

[75] Inventor: Casey S. Vandervalk, Mendon, Mass.

[73] Assignee: Dennison Manufacturing Company, Framingham, Mass.

[21] Appl. No.: 921,672

[22] Filed: Jul. 3, 1978

[51] Int. Cl.[2] ............................................. G01D 15/18

[52] U.S. Cl. .................................. 346/75; 346/140 R

[58] Field of Search .............................. 346/75, 140, 1

[56] References Cited

U.S. PATENT DOCUMENTS

| | | | |
|---|---|---|---|
| 3,596,275 | 7/1971 | Sweet | 346/75 X |
| 3,761,953 | 9/1973 | Helgeson | 346/75 |
| 3,839,721 | 10/1974 | Chen | 346/75 |

*Primary Examiner*—Joseph W. Hartary

*Attorney, Agent, or Firm*—George E. Kersey

[57] ABSTRACT

A system for ink jet printing to collect ink unused during the printing process, and recycle the ink solvent to be reintroduced in the system. The ink stream, after breakup into individual droplets, is selectively charged in a charging tunnel and then passes between a deflection electrode and a collection electrode. The charged droplets are electrostatically deflected to the porous wall of the collection electrode, where they are absorbed. A vacuum pump draws the absorbed droplets into a collection container, which vaporizes the ink solvent and mixes it with air. The solvent-laden air passes through a filter, and is forced through the wall of the deflection electrode in order to control the drying of stray ink drops between the two electrodes.

9 Claims, 2 Drawing Figures

INK JET COLLECTION SYSTEM

BACKGROUND OF THE INVENTION

This system relates to ink jet printing, and more particularly to the collection of unused ink during ink jet printing.

Ink jet printing involves the projection of ink from a nozzle or tube onto a recording medium. Ink jet systems fall into two broad categories in terms of the percentage of the ink drops formed by the system which finally impinge on the recording medium. One class of ink jet devices, the so-called "drop-on-demand" systems, forms ink drops in response to a video signal, all of which drops are used in recording. Two examples of this approach are disclosed in U.S. Pat. Nos. 2,143,376 and 3,341,859. In these systems, a conductive bar is placed behind the recording medium and ink is drawn from the nozzle in response to an applied voltage pulse of opposite polarity.

Those in the second category, the "continuous flow" systems, employ projection of ink from a vibrating nozzle. The ink drops pass through a charging tunnel where they are selectively charged in accordance with a video signal. Further along the path a set of deflecting plates or electrodes functions to deflect the charged drops in response to an applied potential difference. These systems vary in whether the charged drops are finally used in printing, but all share the characteristic that only a small percentage of the ink drops projected from the nozzle finally find their way to the receptor.

In any continuous flow system, therefore, the unused ink must be efficiently collected and removed from the ink stream area to insure continuous, unobstructed flow of ink, and effective deflection of charged ink drops. This has posed design problems for such systems. One approach, which underlies the collection system of the present invention, has been to deflect the charged drops onto a knife edge of a collection electrode (the companion electrode of which is denoted the deflection electrode), where they are drawn by a vacuum system through a porous, stainless steel wall of the collection electrode, and away from the ink flow area. Apparatus utilizing this collection approach is disclosed in Hertz, U.S. Pat. No. 3,916,421.

A collection system of this description is capable of effectively removing only those ink drops which strike the knife edge. Stray ink drops which are prematurely deflected and never strike the knife edge, as well as ink drops which bounce off the knife edge, adhere to and dry upon the surfaces of the collection and deflection electrodes. The vacuum suction system is incapable of removing many of these stray ink drops. The utilization of a second vacuum system to draw ink drops through the deflection electrode reduces the number of ink drops which adhere to the surface of the deflection electrode. This additional vacuum element, however, has no effect on the drops which adhere to the surface of the collection electrode between the knife edge and the charging tunnel.

The accumulation of dried ink drops along the surface of the collection electrode interferes with the flow of ink drops required for continuous ink jet printing. A buildup of dried ink drops along the surface of the collection electrode, particularly at the point where the channel between the collection and deflection electrodes is narrowed by the presence of a deflection step (a narrower area of enhanced deflection), will physically obstruct the flow of ink drops through the electrode assembly. The accumulation of ink drops along the surface of the collection and deflection electrodes therefore prevents effective deflection of undesired ink drops. The narrowed distance between the two electrodes encourages an electric arc to occur between them, producing a momentary loss of voltage in both electrodes. Intermittent loss of voltage prevents continuous deflection and frustrates effective printing of the desired code. Moreover, ink drops dried upon the surfaces of the collection and deflection electrodes may accumulate to the point where an actual bridge is formed between the two electrodes, thereby causing the electrodes to short, completely halting the deflection process.

The problems caused by the drying of ink drops on the electrode structure are especially serious when a solvent based ink is being employed. For printing on paper and other porous surfaces, it is possible to use a water based ink with drying inhibitors. For printing on surfaces such as metal, however, it is necessary to use a solvent based ink. This type of ink is likely to dry in undesirable locations unless its solvent content is maintained.

Accordingly, it is a primary object of the invention to achieve a continuous, unobstructed flow of ink drops through an electrode structure during ink jet printing. A subsidiary object is to avoid accumulation of dried ink drops on the surface of the collection electrode. A related object is to collect and remove stray ink drops before they dry upon the surface of the collection electrode.

Another object of the invention is to effect continuous deflection of ink drops not intended for printing. A related object is to avoid sporadic losses in voltage due to arcing.

A further object of the invention is the avoidance of ink drop bridging between the collection and deflection electrodes. It is a related object to prevent stray ink drops from adhering to the deflection electrode.

Yet another object is the facilitation of ink jet printing with solvent based inks.

SUMMARY OF THE INVENTION

In accomplishing the above and related objects, the ink jet collection system of the present invention includes an electrode assembly, a vacuum pump, a collection container, plastic tubing and plastic funnels, and a filter. In accordance with one aspect of the invention, ink drops projected from an ink jet nozzle pass through a charging tunnel of an electrode assembly, where they are selectively charged in order to remove the charged drops from the system. In accordance with a related aspect of the invention, the majority of the drops so charged are deflected onto a knife edge of a collection electrode, where a vacuum pump draws the drops through a porous stainless steel wall of the electrode.

In accordance with another aspect of the invention, the collected ink passes from the collection electrode through plastic tubing into a collection container, where the solvent in the ink vaporizes and mixes with air. In accordance with a related aspect of the invention, this solvent laden air is routed to a filter, which removes ink particles. In accordance with another related aspect of the invention, the solvent laden air then enters the pump, from which it is forced through another tube to the deflection electrode.

In accordance with a further aspect of the invention, the solvent laden air in the deflection electrode emits from a porous stainless steel inner wall. This creates a nearly impenetrable barrier to smaller ink drops, causing these ink drops to deflect to the knife edge of the collection electrode and thereby drastically curtailing the number of ink drops which impinge on the deflection electrode.

In accordance with yet another aspect of the invention, the presence of escaping solvent laden air insures that those ink drops which are prematurely deflected onto the surface of the collection electrode near the charging tunnel remain fluid. This permits such prematurely deflected drops to be eventually drawn through the collection electrode by the vacuum pump.

BRIEF DESCRIPTION OF THE DRAWINGS

The foregoing and additional aspects of the invention will become apparent in considering the detailed description together with the drawings in which.

DETAILED DESCRIPTION OF THE INVENTION

Figure 1:
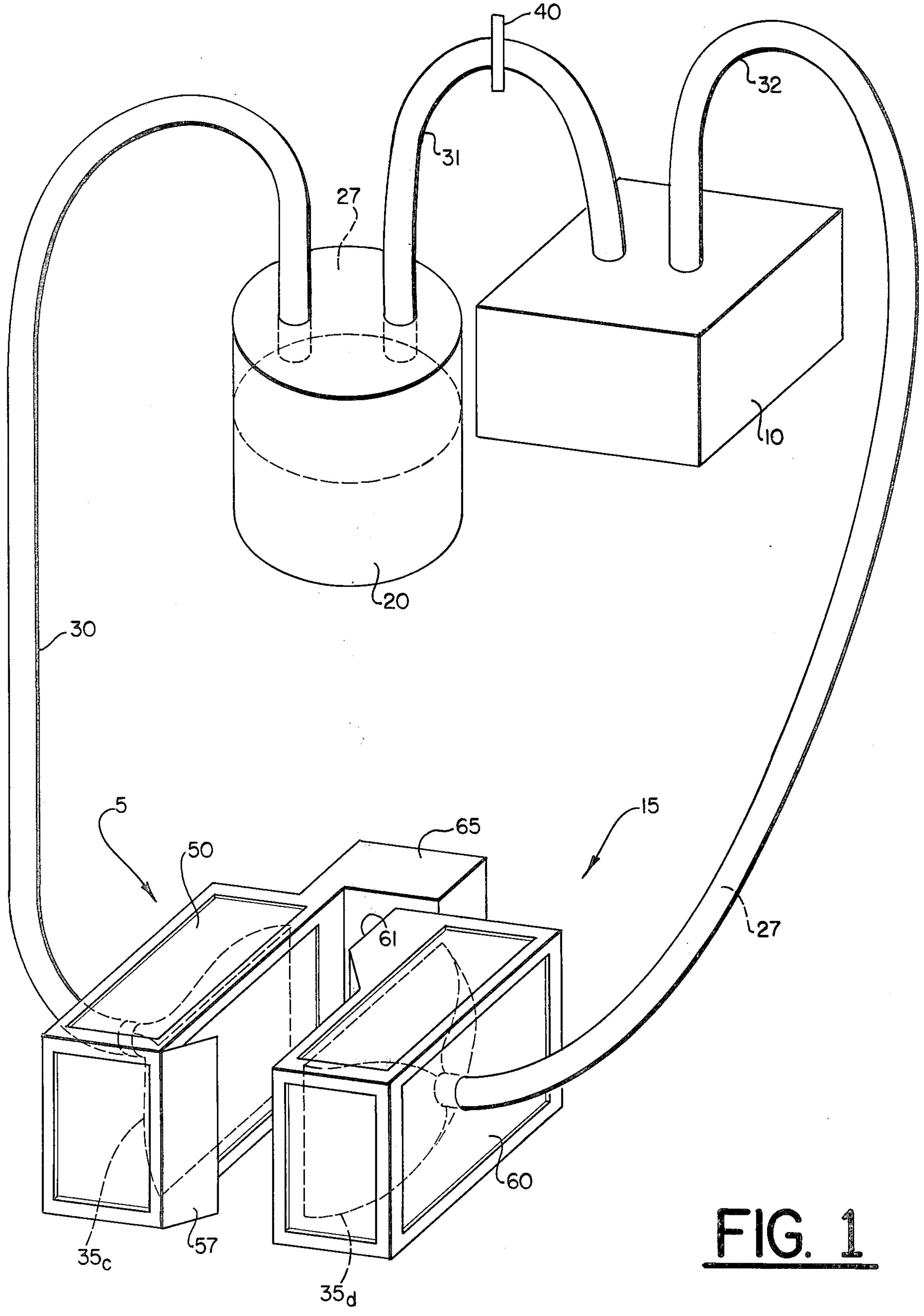
FIG. 1 is a plan view of the collection system of the invention.
Figure 2:
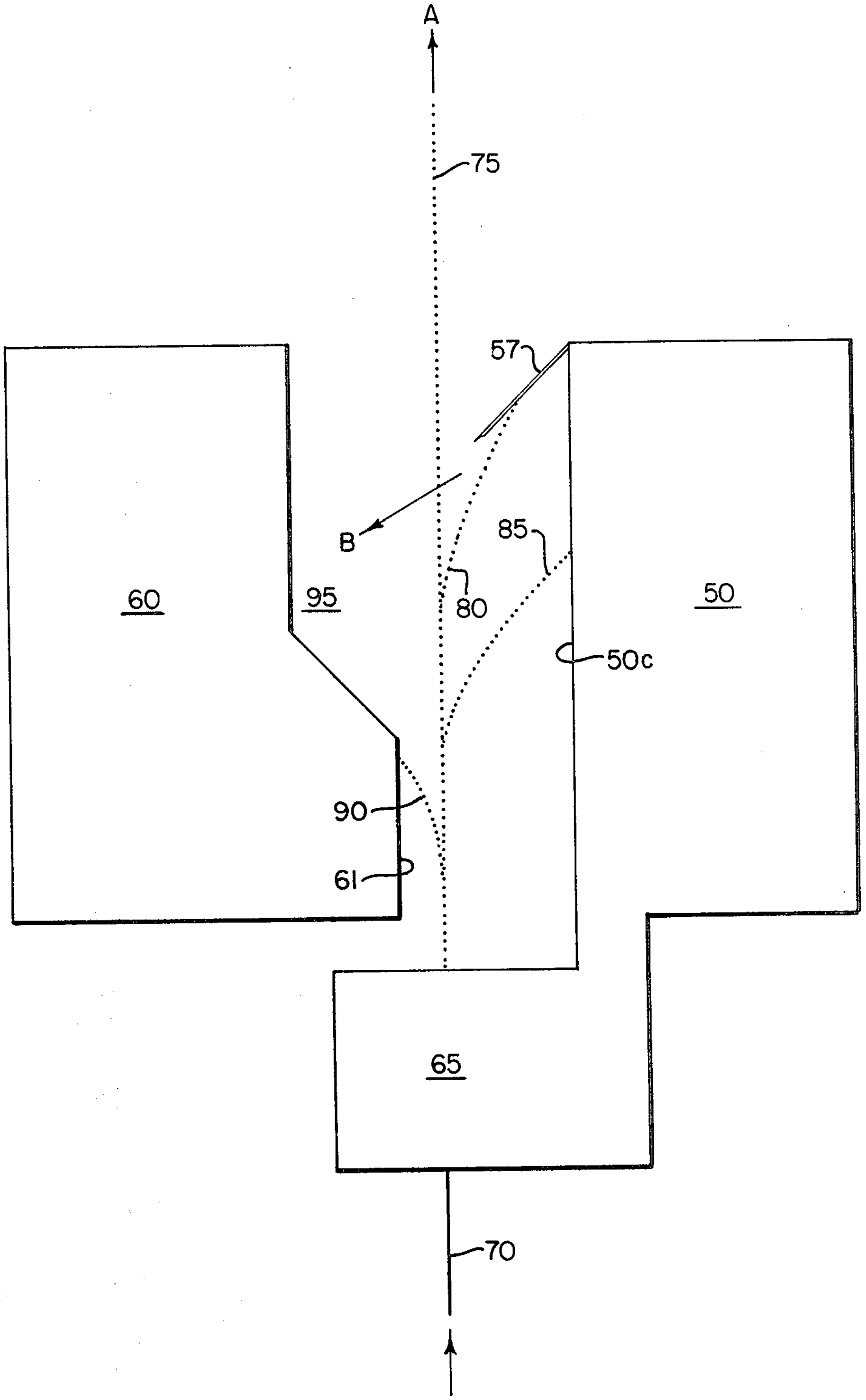
FIG. 2 is a schematic view of the electrode structure area of FIG. 1.

Reference should be had to FIGS. 1 and 2 for a detailed description of the invention. The ink jet collection system of the invention, shown at 5 in FIG. 1, is comprised of a vacuum pump 10, with a suction input and blower output, a collection container 20, plastic tubing 30, 31 and 32, plastic funnels 35*c* and 35*d*, and a filter 40. Ink drops projected from a nozzle (not shown) enter the electrode assembly 15 through a charging tunnel 65, where they are selectively charged electronically in accordance with a video signal transmitted from a character generator (not shown). The charged drops are deflected in the electric field between the collection and deflection electrodes, 60 and 50 respectively, onto a knife edge 57, which is located at the farther edge of the collection electrode 50. The most pronounced deflection occurs in the region of a deflection step 61, which is an extra layer of porous stainless steel on the inner wall of deflection electrode 60. The uncharged ink drops pass through the electrode structure 15 undeflected, subsequently forming the desired image.

The deflection process is subject to error due to various tolerances in the system, as illustrated in the schematic view of the electrode area, FIG. 2. The ink stream 70, upon entering charging electrode 65, breaks up into individual drops which are selectively charged. The uncharged drops continue undeflected in stream 75 toward the record medium, in direction A. Ideally, those drops which are charged should be deflected generally in path 80 so that they will strike the knife edge 57, which will cause them to be routed through the inner wall of collection electrode 50. Certain drops are prematurely deflected, however, and tend to impinge upon the collection electrode 57 at some location such as 85, short of knife edge 57. These drops will dry and build up in groups unless controlled. Other drops may deviate towards deflection step 61, as shown at 90. Deflection step 61 creates a narrower passage which increases the electric field while also creating a greater hazard of ink drop buildup and arcing. Finally, the impact of the deflected ink stream against knife edge 57 creates a mist which largely moves in direction B toward the inner wall of deflection electrode 60.

Those drops that properly strike the knife edge 57 are drawn through the porous inner wall of the collection electrode 50, advantageously porous stainless steel, under the action of a vacuum pump 10. These ink drops pass through a plastic funnel 35*c* within the collection electrode, and thence through a plastic tube 30 to a collection container 20. The collection container 20 has an air tight seal, as do the other connected segments of the system. There, the solvent in the ink 25 vaporizes and mixes with the air within the collection container. Solvent laden air 27 is drawn by the vacuum pump 10 via a tunnel 31 through a filter 40 which filters out any remaining ink particles. The ink particles extracted in the collection container 20 and by the filter 40 are periodically removed from the system by emptying the collection container.

The solvent laden air 27 enters the vacuum pump 10 and is pumped out the blower end through a plastic tube 32 to the deflection electrode 60. The solvent laden air 27 passes through a plastic funnel 35*d* within the deflection electrode 60, and is emitted from the porous stainless steel inner wall (not shown) of the deflection electrode. The escaping solvent laden air forms a barrier (in the region 95 of FIG. 2), which inhibits stray ink drops (not shown) from adhering to and drying upon the surface of the deflection electrode 60. This is effective for all but the larger drops. In addition, the solvent laden air 27 prevents the drying of ink drops 25 which have strayed onto the surface of the collection electrode short of the knife edge 57. This insures that such drops will be drawn through the inner wall 50*c* of the collection electrode 60.

If desired, a second vacuum pump (not shown) with a blower outlet may be placed in the vicinity of the electrode assembly 15, but positioned so as not to interfere with the ink stream 25. This pump is used to keep the system generally free of dust and other undesirable particles.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Improved apparatus for collecting ink drops which have been extracted from a solvent based ink jet of the type including means for selectively charging ink drops in an ink jet having a prescribed path, a deflection electrode to which a potential difference is applied, thereby creating an electric field in which said selectively charged ink drops are deflected, a collection electrode with a porous inner wall, which together with the porous inner wall of said deflection electrode straddles the path of said ink jet, and a member for intercepting deflected ink drops, appended to the porous inner wall of said collection electrode, in which the improvement comprises:

a receptacle for collecting ink drops, wherein a solvent component of the ink evaporates and mixes with air, forming solvent laden air;

means for routing deflected ink drops from the porous inner wall of said collection electrode to said receptacle;

suction means for drawing ink drops through said routing means, and for inducing the inflow of the solvent laden air from said receptacle;

means for further routing said solvent laden air from said suction means to the porous inner wall of said deflection electrode; and means for propelling the solvent laden air through said further routing means, whereby the solvent laden air is emitted from the porous inner wall of the deflection electrode.

2. Apparatus for collecting ink drops as defined in claim 1 further comprising a filter which is positioned between said receptacle and said suction means to remove ink drop particles from the solvent laden air.

3. Apparatus for collecting ink drops as defined in claim 1 wherein the porous inner walls of said collection electrode and said deflection electrode are composed of porous stainless steel.

4. Apparatus for collecting ink drops as defined in claim 1 wherein said routing means comprises a funnel within the collection electrode, and a tube running from the funnel within the collection electrode to said receptacle.

5. Apparatus for collecting ink drops as defined in claim 1 wherein said further routing means comprises a funnel within the deflection electrode, and a tube running from said suction means to the funnel within the deflection electrode.

6. Apparatus for collecting ink drops as defined in claim 1 wherein said suction means and said propelling means are comprised of a vacuum pump with a suction input and a blower output.

7. A method of controlling ink drops of a solvent based ink jet within an assembly for charging and selectively deflecting the ink drops including a charging member, a collection electrode, and a deflection electrode, which comprises the steps of:

intercepting the selectively deflected drops;

drawing the intercepted drops through an inner wall of a collection electrode;

collecting the drawn ink drops in a receptacle;

separating the solvent base of the collected ink drops from the remainder of the ink;

vaporizing the solvent base to create solvent laden air; and forcing said solvent laden air through an inner wall of said deflection electrode into a region between the deflection and collection electrodes.

8. The method of controlling ink drops of claim 7 further comprising the step of filtering the solvent laden air to remove remaining ink particles.

9. The method of controlling ink drops of claim 7 further comprising the step of periodically removing the remainder of the ink from said receptacle.

* * * * *